United States Patent [19]

Stephens

[11] 4,131,189
[45] Dec. 26, 1978

[54] SAFETY APPARATUS FOR OPERATING CLUTCH ACTUATED, MOVABLE RAM MACHINES

[76] Inventor: Daniel R. Stephens, 7282 Judson Ave., Westminster, Calif. 92683

[21] Appl. No.: 787,290

[22] Filed: Apr. 13, 1977

[51] Int. Cl.² .......................... F16P 3/10; B30B 15/12
[52] U.S. Cl. .................................... 192/129 B; 91/43; 92/84; 92/117 A; 192/99 S; 192/131 H; 192/134; 403/32
[58] Field of Search ........... 91/43, 217; 92/84, 117 A, 92/29; 192/99 S, 129 R, 129 A, 129 B, 131 R, 131 H, 133, 134; 100/53; 403/31, 32

[56] References Cited

U.S. PATENT DOCUMENTS

| | | | |
|---|---|---|---|
| 2,101,021 | 12/1937 | Daly | 92/84 X |
| 2,733,799 | 2/1956 | Williams | 192/131 H |
| 2,784,823 | 3/1957 | Ortlepp | 192/129 B X |
| 3,011,610 | 12/1961 | Steibel et al. | 192/131 R |
| 3,092,229 | 6/1963 | Uher | 192/99 S X |
| 3,884,336 | 5/1975 | Williamson | 192/131 R |
| 3,999,477 | 12/1976 | Good et al. | 192/131 R X |

*Primary Examiner*—Allan D. Herrmann
*Attorney, Agent, or Firm*—Grover A. Frater

[57] ABSTRACT

To permit safe operation of clutch actuated moving ram machines, especially when the operator is to be permitted to "float" the ram, the operating linkage to the clutch is formed with a connection which requires input motion of the linkage in predetermined degree to actuate a safety mechanism. The purpose is to prevent ram operation until the operator is out of harm's way. The linkage is formed such that additional motion of the input elements to the clutch is ineffective to actuate the clutch until the safety apparatus is properly positioned whereupon such additional motion of the input member is made effective to actuate the clutch. An apparatus effective to perform according to that method comprises a piston and a cylinder capable of movement relative to one another and both capable of movement relative to a frame on which the clutch is mounted. The piston and cylinder are made movable relative to the frame in response to a predetermined initial degree of movement of an input member and that movement is made to actuate a switch which controls operation of the safety apparatus. A stop prevents further movement of one of the cylinder or piston elements while the other is free to move whereby to permit movement of the input member without output movement. The apparatus includes a means for removing the stop and forcing the piston to one end of its travel in the cylinder after the safety apparatus has been properly positioned whereby movement of the input member is transmitted to the clutch.

11 Claims, 8 Drawing Figures

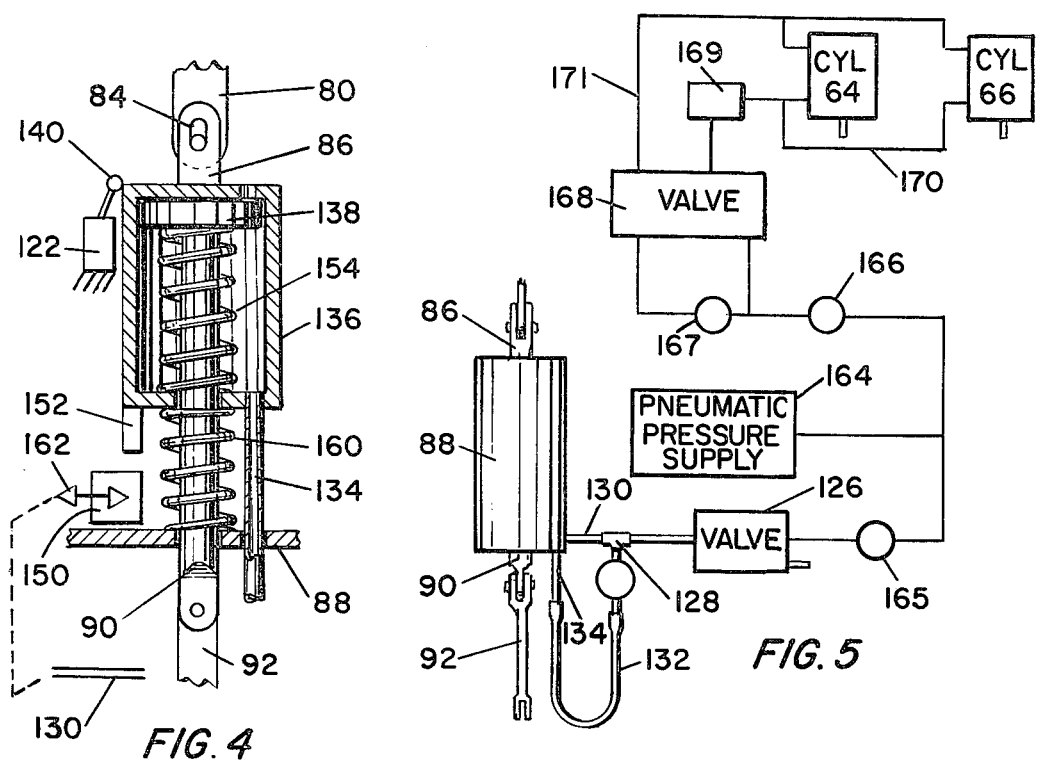
FIG. 4
FIG. 5
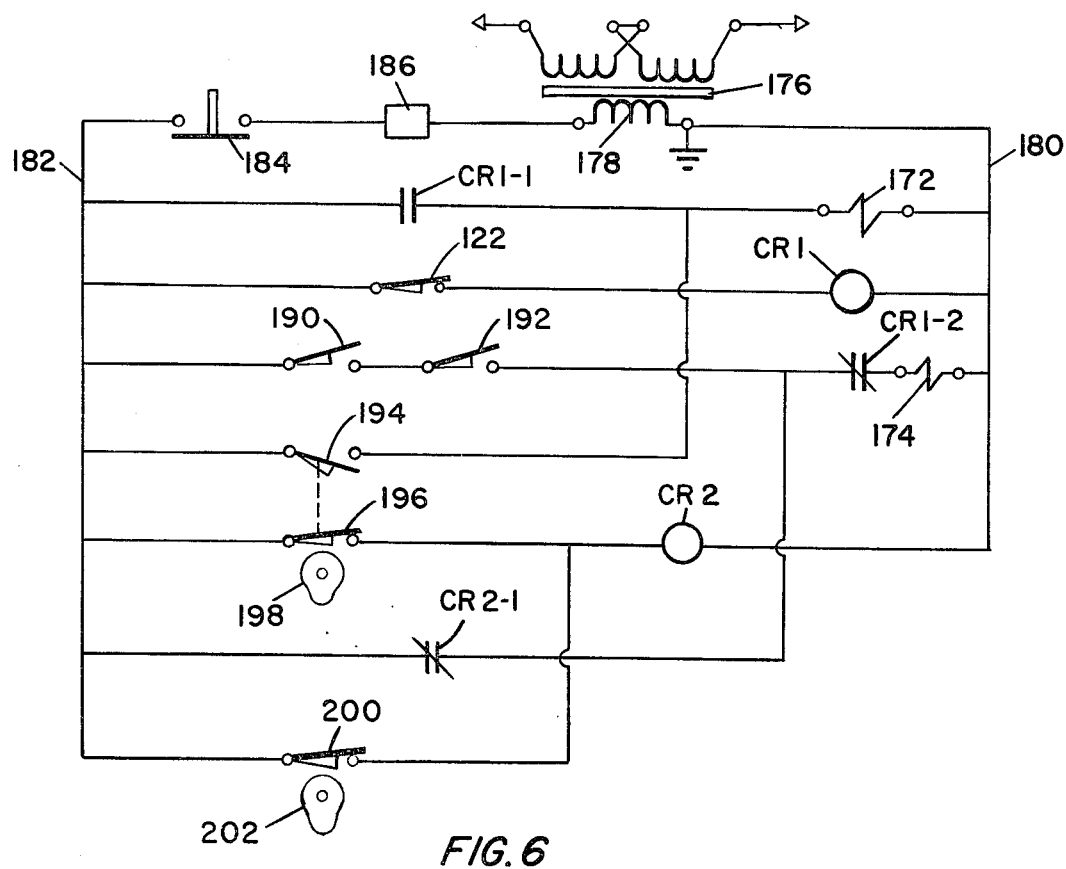
FIG. 6

SAFETY APPARATUS FOR OPERATING CLUTCH ACTUATED, MOVABLE RAM MACHINES

This invention relates to a method by which operation of clutch actuated, movable ram machines, and the safety apparatus associated therewith, can be coordinated, and it relates to an apparatus by which that method can be accomplished.

BACKGROUND OF THE INVENTION

Press brakes, stamping presses, and drawing presses are examples of some of the machine tools in which the work of the machine is accomplished as an incident to movement of a ram. In the case of most machines of that type, operating power is supplied by a prime mover that is connected to the ram by operation of a clutch mounted upon the frame of the machine. While other kinds of clutches are employed, a slip clutch is frequently used which is actuated and released by mechanical movement of its parts. Movement is imparted to those clutch parts through a mechanical operating member the output end of which is connected to the clutch parts and the input end of which is manually moved by the operator's hand or foot. The operating member usually comprises a linkage and lever system. The invention is applicable to the control of slip clutches whether or not the clutch is actuated mechanically or hydraulically or electromagnetically. Use of the slip type clutch facilitates the kind of operation in which the machine ram is moved down in increments, a procedure in which the ram is said to be "floated." In a common arrangement, clutch actuation is accomplished by movement of a foot lever or pedal. In the simplest arrangement, movement of the foot lever is translated by a linkage system directly to the clutch plate. However, that simple system has proven difficult in the past to integrate with operation of safety devices whose purpose is to ensure that the operator is clear of the ram before the ram can be actuated.

SUMMARY OF THE INVENTION

In the invention, initial movement of the press actuating member, whether it be a foot lever or other element, is used to supply a signal as an incident to which the safety apparatus of the press begins its movement into place. In the method, the operator is permitted to move the input element in greater degree than is required to initiate that signal. But the movement is ineffective to produce clutch actuation or movement of the machine ram until the safety apparatus has been positioned or actuated in some predetermined degree. That having been accomplished, positioning or movement of the input member is made to have substantially the same effect that it would have had in the absence of the invention.

A structure by which to practice that method may comprise, and in preferred form does comprise, a structural element that is interposed in series with those linkage elements that are normally used to translate motion of the input member to the clutch actuator as an output member. To do that, the invention provides a "lost motion" connection between the operator's input element and the output element that transmits movement to the clutch actuator. A means is provided for detecting when that lost motion has been overcome and for providing a signal which is caused to actuate a safety apparatus.

Ordinarily, some time is required for that safety apparatus to be positioned and one of the features of the invention is the provision of a means by which the output element is prevented from actuating the clutch for that interval or until the safety apparatus reaches some predefined state. While not required for successful practice of the invention, in the preferred form of the invention such a means is provided. It permits operation of the operator's input element while rendering that input member ineffective to accomplish clutch actuation.

The apparatus includes a means that responds to a signal indicating that the safety elements have been properly positioned to complete a solid interconnection between input and output elements such that they move together, except for the lost motion feature relative to the frame.

That method and apparatus have special meaning when used in conjunction with a safety gate which comprises a main fence having a lower edge and means for mounting the main fence such that points on its lower edge lie substantially horizontally. That fence carries a suspension means for suspending a sub-fence such that the sub-fence hangs parallel to the lower edge of the main fence and at one side of the main fence. The sub-fence is mounted on the suspension means such that the sub-fence is movable upwardly and downwardly relative to the lower edge of the main fence such that the sub-fence is movable pivotally on the suspension means toward and away from the lower edge of the main fence. The sub-fence is provided with a means that makes it move upwardly in response to horizontal forces that are applied on the side of the sub-fence away from the main fence at a point below some given point on the sub-fence and such that the sub-fence is prevented from any substantial upward movement in response to such a force when that force is applied to the sub-fence at a point above that given point.

In the drawings:

FIG. 4 is a view of a fragment of the apparatus of FIGS. 1 and 2, a part of which is shown in cross-section and a part of which is shown schematically;

FIG. 5 is a diagram of the electropneumatic portion of the inventive system; and FIG. 6 is a schematic diagram of the electrical portions of a system embodying the invention.

Figure 1:
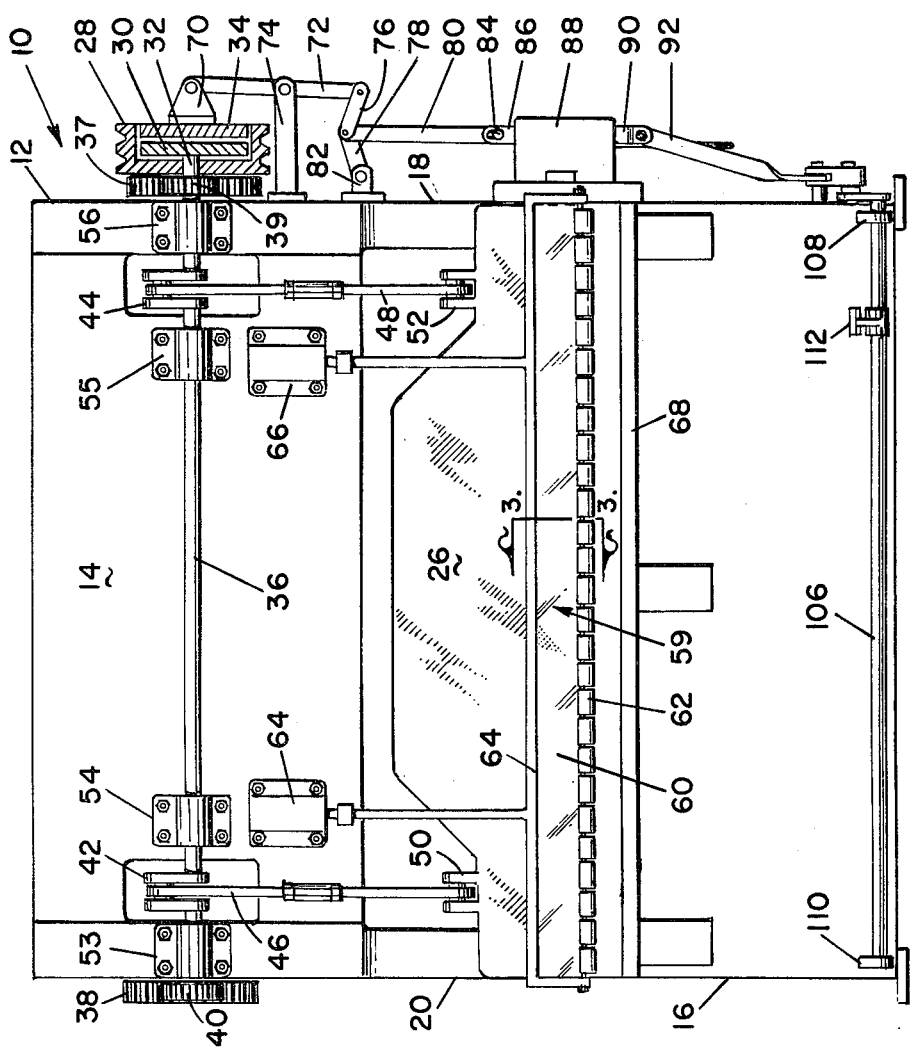
FIG. 1 is a view of a press brake shown in front elevation, except that the clutch is shown schematically in cross-section, to which the invention has been applied.

The machine tool which is generally designated 10 in FIG. 1 is a press brake. It comprises a frame 12 the upper portion 14 and lower portion 16 of which are interconnected by side members 18 and 20.

The function of the press brake is to form bends along a line in metal sheets. To perform that function the brake is fitted with a set of tools. The tool set usually takes the form of a pair of elongated V-shaped members. They are usually as long as the press is wide. The female portion of the tool is bolted to the frame with its V groove opening upward. The male portion of the tool has its V-shape extending downwardly and it is fastened to, or forms the lower edge of, a ram that is movable vertically relative to the frame. The press brake shown in the drawing is fitted with a female V-shaped tool 22 which is bolted to the lower frame 16 and a male V-shaped tool 24 which forms the lower edge of a ram 26. The ram is confined to vertical movement by a means that is hidden from view in this embodiment.

Power with which to move the ram is supplied by a motive means such as an electric motor and a series of belts which transmit power from the motor to a fly-wheel mounted on the press. Often, as in the press shown, the fly-wheel forms one element of a clutch which includes a clutch plate mounted axially with the fly-wheel on a shaft which is coupled through a set of gears to a crank shaft. Crank arms extend from the crank shaft to the ram. Only a portion of that apparatus is visible in FIG. 1. The motor and drive belts have been omitted for the sake of clarity. The fly-wheel is designated 28. If forms part of a clutch whose output plate 30 is connected to an output shaft 32. The output plate 30 and the fly-wheel 28 are interconnected when they are forced together by a clutch plate 34. When the output plate and the fly-wheel are interconnected, the shaft 32 rotates and is effective through a set of gears to rotate a crank shaft 36. Although most of it is hidden in the drawings, the output shaft 32 extends the full width of the brake. It is connected to a gear 37 at the right of frame side 18 and is connected to a gear 38 at the left of frame side 20. Gears 37 and 38 drive gears 39 and 40, respectively, through intermediate gears which are hidden from view in this drawing. Gears 39 and 40 are connected to opposite ends of the crank shaft 36. The crank shaft is held on the frame by four pillow blocks 53, 54, 55 and 56.

The crank shaft is formed with two cranks 42 and 44. Rotary motion of the cranks is translated into linear up and down motion of the ram 26 by a pair of crank arms. Crank arm 46 connects crank 42 to the elements 50 at the upper left side of the ram 26. Crank arm 48 connects crank 44 to the structure 52 at the upper right of ram 26. Each crank arm includes a structure by which it may be lengthened and shortened so that it is possible to adjust the degree in which the tool sections mate with one another whereby sheet material of different thicknesses can be accommodated and so that bends of less than 90° can be formed.

The press brake shown is provided with a safety apparatus sometimes called a "gate" which is movable into position in front of the tool set in an effort to ensure that the operator cannot place his hands or other portions of his body between the elements of the tool set as the ram is lowered. The safety apparatus in this case is formed by a main fence 60 and a number of elements 62 which together from a sub-fence. The main fence and its sub-fence are mounted upon a frame 64 which is fixed to the piston rods of two piston and cylinder assemblies identified by the numerals 64 and 66, respectively. The piston and cylinder sets 64 and 66 operate together to move the main fence and sub-fence upwardly and downwardly. That structure and the work table 68 will be described in greater detail below.

The clutch is engaged and disengaged by movement of the clutch plate 34. When that plate moves inwardly, it presses the output plate or member 30 against the fly-wheel 28 so that they are frictionally engaged and so that power will be transmitted from the fly-wheel to the crank shaft 36. The structure by which the clutch plate 34 is moved comprises a bifurcated bracket 70 which is fixed to the plate. A lever 72 has pivotal connection at one end to that bifurcated bracket and it also has pivotal connection at an intermediate point along its length to a bifurcated fulcrum member 74 that is mounted at the side 18 of the press. The other end, the lower end in FIG. 1, of the lever 72 has pivotal connection to a scissor mechanism comprising arms 76 and 78. Those two arms have a common pivotal connection to the upper end of a link 80. The lower end of arm 72 has pivotal connection to the arm 76. The other end of arm 78 has pivotal connection to a bifurcated bracket 82 which is mounted upon the press frame.

Figure 2:
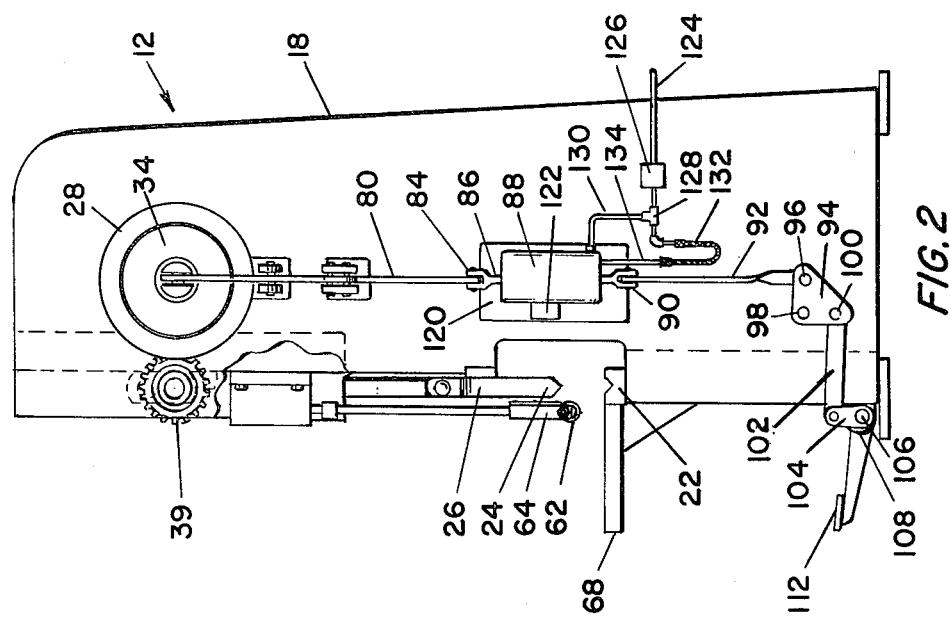
FIG. 2 is a view in side elevation of the apparatus shown in FIG. 1.

The lower end of link 80 has a lost motion connection at 84 to an element 86 that projects upwardly from a housing 88. Another element 90 projects downwardly from that housing where it has pivotal connection to the upper end of a link 92 whose lower end has pivotal connection to a triangular plate 94 at pivot point 96. That triangular plate 94 has pivotal connection at pivot 98 to the frame of the press brake. The third pivot 100 is connected to a link 102 that has pivotal connection to a crank 104 which is fixed to a shaft 106. That shaft is mounted for rotation in a pair of brackets 108 and 110. A foot pedal 112 is clamped to the shaft 106 so that depression of the foot pedal rotates shaft 106 and crank 104. Referring to FIG. 2, if the foot pedal 112 is depressed downwardly, shaft 106 and crank 104 will rotate counterclockwise. That will exert a pull upon linkage 102 and cause the triangular plate 94 to rotate about pivot 98 in a clockwise direction. As a consequence, lever 92 and the element 90 will be moved downwardly. The degree, and the circumstance in which that motion is transmitted to the element 84 which extends upwardly from housing 88, will be defined below. However, there is a circumstance in which downward movement of element 90 results in downward movement of element 84. When the lost motion at connection 84 is overcome, provided that the safety apparatus is in place, the link 80 begins to move downwardly. Scissor action at the common pivot of link 80 and arms 76 and 78 act to force the lower end of arm 72 away from the press frame in a pivotal motion around the fulcrum member 74. The effect of that is to force the upper end of arm 72 and the bifurcated connection 70 inwardly so that the clutch plate 34 is pressed against the fly-wheel to complete a frictional connection between them. If it is assumed that elements 90 and 84 are interconnected, and move together, then a reversal of that action will take place when the foot pedal 112 is released. In most applications, it is desirable to include a spring return or a power return system to ensure that the operation of the linkage system is reversed when the foot pedal is released.

The housing 88 is mounted upon a base 120 along with the housing 122 of a switch whose actuator is located inside of housing 88. Pressurized fluid, in this case pressurized air, is delivered to the housing 88 from a source pipe 124 through an electropneumatic valve 126 whose output is divided at a Y connector 128 between a pipe 130 that leads to the side of housing 88 and a line which includes a flexible section 132. The latter connects to a pipe which terminates at a point within the housing and is movable relative to the housing. The movable pipe is identified by the reference numeral 134.

That structure is shown in FIG. 4. Only part of the housing 88 is shown. The housing has fixed connection to the base 120 and to the frame of the press, so that housing 88 can be considered as part of the frame. The movable pipe 134 is fixed to, and opens to the interior of, a cylinder 136 which forms part of a cylinder and piston assembly whose piston is designated 138. The cylinder 136 is movable relative to the frame and in this embodiment, it is limited to movement in the direction of the axis of the shaft 90 of the piston. Shaft 90 corresponds to element 90 of FIGS. 1 and 2. It has pivotal connection to link 92. Element 86 of FIGS. 1, 2 and 4 is shown to be fixed to the upper end of cylinder 136 and it is movable with the cylinder relative to the frame or housing 88. Switch 122 is mounted on the frame. Its actuator 140 is operated by downward movement of cylinder 136.

Element 86 and link 80 are interconnected at the lost motion connection 84. That connection includes a pin and slot and it is not until the element 86 is moved downwardly so that the top of the slot in element 86 contacts the pin that link 80 is made to move. Actuator 140 is located relative to the cylinder 136 such that the switch actuator is actuated during lost motion movement of element 86.

The member 150 is a block that is movable by a means, advantageously an air cylinder, into and out of the path of movement of a projection 152 that extends from cylinder 136. The degree of downward movement of the cylinder 136 corresponding to the lost motion distance is permitted before the projection 152 engages the stop. After that lost motion has been taken up, further downward movement of the cylinder is prevented by the stop. However, downward pull on the link 92 will pull the piston rod 90 downwardly in the cylinder 136 against the bias of spring 154. Spring 154 is a coiled compression spring that is trapped between the lower end of the piston 138 and the lower face of the cylinder 136 and normally holds the piston at the top of its stroke. Thus, notwithstanding that the stop occupies the position shown, it is possible to pull downwardly on link 92, as by stepping down on the foot pedal 112. The effect of doing that is to move the piston and cylinder assembly downwardly against the bias of coil compression spring 160 to permit actuation of the switch 122 as the lost motion at the connection 84 is overcome. Thereafter, the movement of the piston 138 will cease as projection 152 engages the stop and any further downward movement of link 92 will result in lowering of the piston 138 by compression of spring 154.

Upon application of pneumatic pressure to remove the stop 150 as indicated by arrow 162, the cylinder will be freed for downward movement. The same action that is employed to remove the stop is employed to complete a solid connection between the piston 138 and the cylinder 136. That is done simply by applying pressure in the space below the piston so that the piston is held firmly at the upper limit of its travel. That having been done, and the lost motion at connection 84 having been taken up, link 92 and link 80 are interconnected against relative movement. Thereafter, movement of the foot pedal is translated directly into actuation of the clutch plate 34. Downward movement of the foot pedal results in downward movement of the piston 138 and cylinder 136 and of link 80. Upon release of pressure at the foot pedal spring 160, or apparatus to be described below, will urge both the piston 138 and clyinder 136 upwardly so that pressure on the clutch plate is released and the clutch is disengaged. As indicated above, in some cases, the return spring may be omitted.

It will be apparent that various modifications may be made in the design of the structure shown in FIG. 4. Thus, for example, instead of using pneumatic pressure to drive the piston to end of the cylinder, the two elements may be fixed against relative motion by inflation of one element. A number of other schemes are possible, but the one that is illustrated is now considered to be the best mode of practicing the invention.

The lost motion connection is used in conjunction with switch 122 and its actuator 140 to initiate whatever safety measures must be taken with respect to the machine tool before the ram is lowered. In the embodiment shown, actuation of the switch 122 is made to initiate lowering of the gate 59 to the position below the intermediate position that it is shown to occupy in FIGS. 1 and 2. The press structure is provided with switches of the limit switch variety which are arranged to sense whether or not the gate has been lowered in required degree. Those switches are connected in electrical circuitry which energizes the electropneumatic valve to permit the application of pneumatic pressure to retract the stop 150 and to apply pressure to unit 88. The hydraulic and electrical circuitry by which that operation is accomplished is illustrated in FIGS. 5 and 6.

In FIG. 5, pneumatic pressure from a supply source 164 is applied, through pressure regulator 165, to the normally closed valve 126. When that valve is opened, pressurized air flows to the Y connector 128 and from there to lines 130, 132, and 134, as previously described in connection with FIG. 2. When air pressure is applied to line 130, the stop 150 of FIG. 4 is retracted from the position that it is shown to occupy in that figure, such that relative movement between the piston 136 and the frame, beyond the lost motion movement, becomes possible. Application of pneumatic pressure to lines 132 and 132 results in fixing of the piston 138 against the top end of the cylinder as previously described.

Pressurized air from the supply 164 is also supplied through a high pressure regulator 166 to the high pressure inlet of a five port, four-way valve 168 and to a low pressure regulator 167. When valve 168 is de-energized, air is permitted to exhaust from the rod end of cylinders 64 and 66 via line 170 while low pressure is applied to the upper end of both cylinders via line 171. As a result, the pistons in those cylinders move downwardly to move the gate toward the positions shown in FIGS. 1 and 2. When the valve is energized, flow is reversed. High pressure is applied through line 170 to the two cylinders to lift the gate as pressure in the head end of the cylinders is exhausted to atmosphere via line 171 and valve 168. The lowering rate of the gate is controlled by a flow controller 169 in line 170. The flow controller is formed by a check valve and a metering valve in parallel such that high pressure flows into the rod end of the cylinders rapidly through the check valve. When the cylinders move down, exhaust air closes the check valve so it flows out of the cylinders through the metering valve and the gate moves down at a rate determined by the metering valve adjustment.

Valves 126 and 168 are actuated electromagnetically by coils that are shown schematically in FIG. 6. The operating coil of valve 126 is labelled 172 in FIG. 6. The electromagnetic actuator of valve 168 is labelled 174. The circuit also includes a transformer 176 whose secondary winding 178 is connected between ground and line 180 at the right and line 182 at the left. The connection from line 182 to the secondary winding 178 includes, in series, a manually operated switch 184 and a fuse 186. The manual switch has one set of contacts in this embodiment. Switch 122 and the coil CR1 of a control relay are connected in series between lines 182 and 180. The actuating coil 172 is connected between lines 180 and 182 in series with a set of normally open contacts CR1-1. Two limit switches 190 and 192 are connected in series with one another and with a set of normally closed contacts CR1-2 and the actuating coil 174 of valve 168 between lines 180 and 182. A limit switch 194 is connected in parallel with normally open contacts CR1-1. Another limit switch 196, which is mechanically connected to limit switch 194 by a common actuating cam 198, is connected in series with a coil of a control relay CR2 between lines 180 and 182. Another limit switch 200, which is actuated by a cam 202, is connected in parallel with limit switch 196. Finally, a normally closed contact CR2-1 is connected in parallel with a series combination of limit switches 190 and 192.

Limit switches 190 and 192 are arranged so that they detect when the two ends of the gate have been lowered to a position sufficiently close to the table or apron 68 of the press to perform its safety function satisfactorily. When the gate is in that position, those two limit switches are closed.

Cams 198 and 202 are operated as an incident to movement of the press ram. Limit switch 194 remains open as the ram is moved from top dead center of the crank down to a position just above bottom dead center. It remains closed until the ram has been moved through the remainder of the cycle to a point almost at top dead center. The limit switch 196 is closed when the limit switch 194 is open. Limit switch 200 is open throughout the operating cycle except when the ram is near top dead center both at the beginning of the stroke and at the end.

The system operates as follows. The press is readied for operation by manually closing switch 184. As a consequence of that, lines 180 and 182 are energized. Control relay CR1 is energized through the initially closed foot pedal operated switch 122. CR1 being energized, contacts CR1-1 are closed and that results in energization of the operating winding of the four-way safety gate valve 168 to open its high pressure port. That port being open, the safety gate is raised to its upper position as previously described. Since the machine tool is normally stopped with its ram at or near top dead center, limit switch 196 will be closed and the relay CR2 energized. As a consequence of that, contacts CR2-1 and CR2-2 will be opened to prevent energization of valve actuator coil 174.

The system will remain in that condition until the foot lever 12 is depressed to open switch 122 and de-energized relay CR1. De-energization of relay CR1 opens contacts CR1-1 to de-energize the safety gate valve operator 172. As a consequence of that, the electropneumatic valve 168 is actuated so that low pressure is applied to the head end of cylinders 64 and 66 while the rod end of those cylinders are permitted to exhaust through line 70 and the metering valve of the flow controller 169. As a result of that, the gate is made to descend, and when it has descended to safe position, limit switches 190 and 192 are closed. Those two limit switches are in series with the contacts CR1-2 of relay CR1 and the energizing winding 174 of electropneumatic valve 126. Contacts CR1-2 close whenever the foot pedal 112 is depressed sufficiently to overcome the lost motion connection between elements 80 and 86 to open the switch 122. Contacts CR1-2 being closed, a circuit is completed through the gate down limit switches 190 and 192 and operating winding 174 of valve 126. That valve is opened and pneumatic pressure is applied to retract the stop 150 and to apply a pressure to the interior of cylinder 136 below the piston head 138. Piston 138 is connected directly to the foot pedal 112 and its position relative to the housing 88 and the frame of the press brake will be determined by the degree in which the foot pedal has been depressed. The effect of admission of pressurized air to the space in the cylinder below the piston is to drive the cylinder downwardly until its upper wall engages the upper surface of the piston. That action is readily accomplished because there is a port open to the atmosphere at the upper wall of the cylinder 136. Thus it is that the piston and the piston head 38 and the cylinder 136 are held interconnected against relative movement so that movement of link 92 will be transmitted to link 80. Again, movement of those linkages is made possible because the opening of valve 126 also results in the application of pneumatic pressure by line 130 that retracts the stop 150. Further depression of foot pedal 12 will result in engagement of the clutch. Ram 26 will begin to move down and rotate the cam 198. At some point, it will open limit switch 196 and close limit switch 194. That will occur simultaneously. Relay CR2 will be de-energized and contacts CR2-1 will close to establish a path in parallel with limit switches 190 and 192 for energizing the operating winding 174 of electropneumatic valve 126. Simultaneously, limit switch 194 is closed to establish a parallel path around contacts CR1-1 by which the operating winding 172 of electropneumatic valve 168 is actuated. That will raise the safety gate as the press brake tools close. The free end of metal being operated on by the press brake will whip upwardly and the gate is raised to permit that to happen.

Since the clutch remains engaged, the ram will continue through its stroke. When that stroke has been completed to approximately 350° of the crank rotation, then the contact 200 closes and energizes relay CR2. That will result in opening of contacts CR2-1 and de-energization of the operating winding 174 of the valve 126. The limit switches 190 and 192 will have been opened upon raising of the gate so that the energization of the coil 174 cannot be maintained by that path. Consequently, the ram stops at or near top dead center. At that point, foot pressure is released to close switch 122. That energizes the relay CR1 and closes contacts CR1-1. That having been done, the operating coil 172 of valve 168 will be energized and high pressure will be applied to cylinders 64 and 66 to maintain the safety gate in its up position. In this embodiment, the operating point limit switches 194 and 196 is made adjustable to accommodate different degrees of whip up of the stock being processed. Because of that, the additional limit switch 200 is added to ensure that a switch action is available for stopping the brake at or near top dead center.

If at any time during the cycle the foot lever is released, the limit switch 122 will close its contacts CR1-1 to energize the gate valve winding 172. That will raise the gate to open the limit switches and, unless the press has moved through bottom dead center, the press will stop.

The mode of operation thus described is one of many that can be provided by modification of the electrical circuitry. The fact that a number of specific modes of operation are available is accounted for by the versatility of the apparatus shown in FIG. 4.

Figure 3:
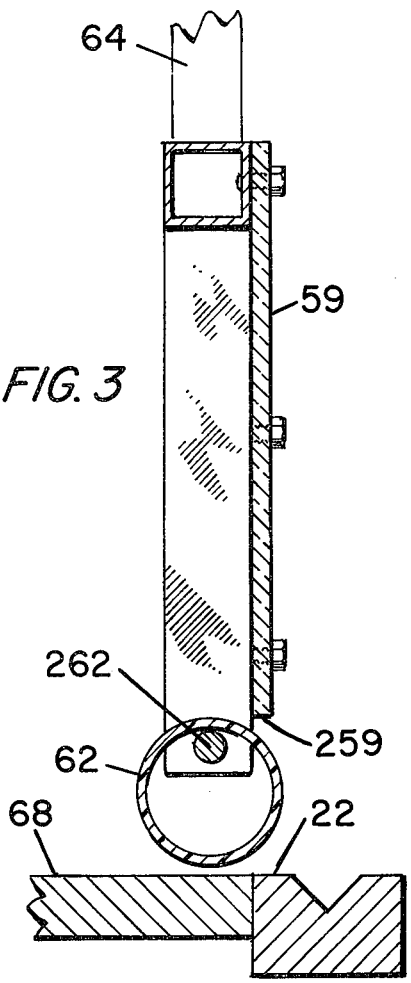
FIG. 3 is a cross-sectional view taken on line 3—3 of FIG. 1.

While it has greater application to metal shears than to press brakes, one of the important features of the invention is more specifically illustrated in FIG. 3 which shows some details of construction of the gate fence and sub-fence. The main fence 59 is advantageously made of a transparent material such, for example, as a transparent plastic that is not easily shattered. It is fastened to the frame 64 of the gate. Because the main fence is made of transparent plastic, the tools behind the fence are easily visible to the press operator. In this embodiment, the sub-fence 62 is formed by a number of short lengths of tubing. A number of those lengths are provided so that they extend substantially the full length of the press. They are suspended on a member that is positioned near the lower edge of the fence and on the operator's side of the fence. In this embodiment, the suspension means comprises a rod 62 which extends entirely across the front of the press and is attached at its ends to the frame 64. Alternative arrangements are possible such, for example, as the employment of shorter rods or hangers fastened to the transparent fence 59. However, the long rod shown is the presently preferred form of the invention. The rod 262 serves both as a hanger for the sub-fence and as a fulcrum around which the sub-fence can pivot. It will be apparent in FIG. 3 that gravitational force will cause the sub-fence 62 to hang downwardly from the rod 262 as a suspension point. If a force is applied horizontally to the sub-fence 62 from the operator's side of the main fence (from left to right in FIG. 3), the sub-fence will tend to pivot around the suspension rod 262 as a fulcrum. However, counterclockwise rotation, in FIG. 3, of the sub-fence will be presented because the wall of the sub-fence will engage the lower edge of main fence 59 unless the horizontal force is applied below some level of the sub-fence. If the horizontal force is applied at or near the bottom of the sub-fence, the sub-fence will be driven upwardly. It will tend to pivot about the lower edge 259 of the main fence and may actually pivot in the clockwise direction as the sub-fence is raised. That result is obtained because the wall of the sub-fence, being curved, slopes downwardly and away from the operator below the midline of the sub-fence. A horizontal force will be effectively divided into a vertical component and a horizontal component that forms a couple with a reaction force at the point of engagement of the sub-fence with the lower edge 259 of the main fence. It will be apparent that a relatively thin workpiece of sheet metal can be moved under the sub-fence toward the tools because the sub-fence will simply be lifted. On the other hand, any attempt to squeeze something thicker, such, for example, as the operator's fingers, between the sub-fence and the work table 68 will result in the sub-fence being rotated pivotally on the suspension rod 262 until the sub-frame engages the lower edge 259 of the main fence. Further rotation of the sub-fence will be prevented and the operator will be unable to get his fingers under the sub-fence. In a typical example, the sub-fence 62 is formed of a plastic tube having an inside diameter of approximately two inches and an outside diameter of approximately 2 ¼ inches. The spacing, in that example, between the suspension rod 262 and the lower end of fence 259 is about ¾ inch.

It has been explained that the function of spring 160, which is visible in FIG. 4, is to return the cylinder 136 and piston 138 assembly upwardly to move the upper linkage so that the clutch will release when the pull on link 92 is released. It has another function. It lifts the piston and cylinder assembly so that actuator 140 is moved and switch 122 is closed when the foot pedal 112 is released.

It will become apparent from an examination of FIGS. 1, 2 and 4 that the switch 122 and its actuator 140 could be moved and actuated at a number of points along the linkage between the foot pedal and the lost motion interconnection. While that is true, the preferred location is intermediate piston 138 and the lost motion connection. It is shown to occupy such a position in FIG. 4 where the switch is shown to have its actuator in the line of movement of the cylinder 136.

Figure 7:
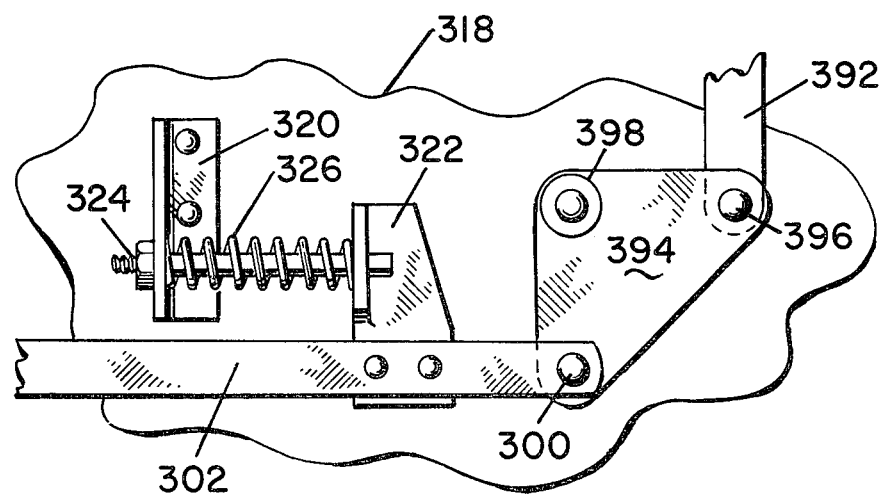
FIG. 7 is a modification of the linkage of FIG. 2.

The functions performed by spring 160 can be performed at any point along the linkage from the foot pedal to the lost motion connection. That is illustrated in FIG. 7 which shows a structure that is suitable for replacing the triangular member 94 in FIG. 2 and the links 102 and 92. The triangular member 394 of FIG. 7 corresponds, generally, to the triangular member 94 in FIG. 2. Similarly, links 302 and 392 of FIG. 7 corresponds, generally, to links 102 and 92 in FIG. 2. They are intended for mounting upon the frame 318 of a machine tool which clutch is to be controlled. Triangular plate 394 has pivotal connection to the frame 318 at a pivot pin 398. Link 302 is pivotally connected to triangular plate 394 at pivot pin 300, and link 392 is connected to the triangular plate at pivot pin 396. Angle bracket 320 is bolted to the side of frame 18 at a point just above the link 302. A second angle bracket 322 is firmly fastened to link 302 at a point intermediate bracket 320 and pivot pin 300. A guide pin 324 is bolted at one end to the bracket 320 so that it extends substantially parallel with the link 302. The other end of guide pin 304 extends through an opening in the wall of bracket 322. A compression spring is mounted upon the guide rod so that it is trapped between brackets 320 and 322. Link 302 is assumed to be connected to a foot operated lever in much the same manner that link 102 is connected to foot pedal 112 in FIG. 2. Operation of the foot pedal associated with link 302 results in movement of the link toward the left in FIG. 7, and that motion will operate to compress the spring 326. The triangular plate would rotate about pivot pin 398 pulling link 392 downwardly. Link 392 is connected to a unit similar to the apparatus shown in FIG. 4, and it includes a switch similar to switch 122. Upon release of the foot pedal, the link 302 would be returned to the right in FIG. 7 by the action of compression spring 326. That would result in counterclockwise rotation of the triangular plate 394 and a lifting of link 392. Lifting that link would overcome a lost motion connection between link 392 and the clutch to be operated by its movement.

Figure 8:
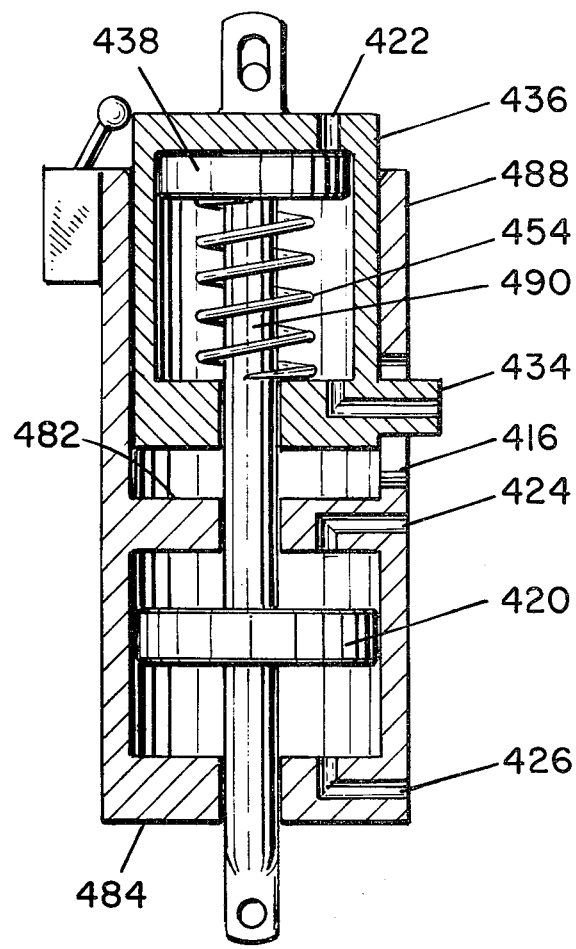
FIG. 8 is a modification of the piston and cylinder arrangement of FIG. 4.

It will be apparent that spring 326 in FIG. 7 could be replaced by a small cylinder and piston assembly. Another alternative that permits greater control is shown in FIG. 8. The apparatus shown in that figure corresponds generally to what is shown in FIG. 4, except that the spring 160 has been replaced by a second piston and cylinder assembly the cylinder of which is fixed to the housing of the unit and, ultimately, to the frame of the machine with which it is associated. In FIG. 8, the numeral 436 identifies a cylinder that corresponds, generally, to cylinder 136 of FIG. 4. Piston 438 corresponds, generally, to piston 138 of FIG. 4, except that the piston rod 490 is longer. Piston 436 is capable of reciprocal movement within a cylinder recess formed in the upper end of a housing member 488. That housing is elongated and generally cylindrical except that it has a dividing wall 482 extending transversly across its interior in the mid region between its upper and lower ends. The lower end is closed by a wall 484. A portion of the side wall of the housing cylinder 488 is cut away at 416 to form a slot in which air inlet nipple 434 is free to move as the inner cylinder 436 reciprocates within the upper cylinder recess of housing 488.

Piston rod 490 extends from the lower face of piston 438 through the lower wall of cylinder 436 and then through the transverse wall 482 of the housing 488 down into the space between transverse wall 482 and the end wall 484 of the cylindrical housing. In that space, the piston rod 490 is connected to a second piston 420. Pneumatic pressure can be applied to the interior of cylinder 436 below the piston head 438 through the air supply nipple 434. Air is exhausted from the space above piston 438 through a relief opening 422. The piston 438 is normally biased to the upper limit of its travel by spring 454 which corresponds to spring 154 in FIG. 4.

The space in the cylindrical housing 488 above the transverse wall 482 and below the bottom wall of cylinder 436 is open to atmosphere through slot 416 so that no pressure other than atmospheric pressure is developed in that space. However, the space above piston 420 may be pressurized and exhausted through an air passageway 424 and the space below piston 420 may be pressurized and exhausted through a passageway 426. This unit includes a removable stop corresponding to stop 150 of FIG. 4, but it has been omitted from FIG. 8 for the sake of clarity. With the understanding that that stop is included but not visible in the drawing, the operation of the apparatus in FIG. 8 is the same as the operation of the apparatus in FIG. 4 with the exception that the spring 160 of FIG. 4 has been replaced by the piston 420 in FIG. 8, together with means to vary the amount and the sign of the pressure differential across the piston 420. By controlling pressure at passageways 424 and 426, upper and downward movement of piston rod 490 can be induced and impeded at will. The advantage of using the pressurized piston and cylinder assembly instead of the spring 160 is that the amount of force applied to move the rod 490 upwardly and downwardly can be altered and, unlike the spring force which varies with the degree of compression, the force by which piston rod movement is induced or impeded in FIG. 8 can be maintained uniform.

Although I have shown and described certain specific embodiments of my invention, I am fully aware that many modifications thereof are possible. My invention, therefore, is not to be restricted except insofar as is necessitated by the prior art.

I claim:

1. In combination:
   a frame;
   first and second elements carried on said frame, each of said elements being mounted for movement relative to the other of said elements and to said frame;
   first movement restricting means, operable upon movement of said first and second elements together in one direction in a given degree relative to said frame for restricting further movement of one of said elements in further degree in said one direction while permitting such further movement of the other element; and
   second movement restricting means responsive to a first condition for preventing relative movement between said first and second elements while permitting movement of said elements together relative to said frame.

2. The invention defined in claim 1 which further comprises enabling means responsive to movement of said elements together in said given degree relative to said frame for enabling establishment of said first condition.

3. The invention defined in claim 2 in which said enabling means comprises a switch and means for actuating said switch as an incident to such movement together with said elements in said given degree.

4. The invention defined in claim 3 in which said switch is an electric switch.

5. The invention defined in claim 3 in which said first and second elements together comprise a piston and cylinder assembly, and biasing means normally urging said piston toward one end of said cylinder.

6. The invention defined in claim 5 in which said first movement restricting means comprises a stop carried by said frame and normally imposed in the path of movement of said cylinder in said one direction.

7. The invention defined in claim 6 in which said second movement restricting means comprises means for utilizing fluid pressure difference for removing said stop from said path of movement and for clamping said cylinder and piston against movement relative to one another.

8. The invention defined in claim 1 which further comprises biasing means interposed between said first and second elements for yieldably urging them toward a given relative position.

9. The invention defined in claim 8 in which said first movement restricting means comprises a stop carried by the frame and normally imposed in the path of movement, relative to said frame, of said first element.

10. The invention defined in claim 9 in which said second movement restricting means comprises means for moving said stop out of said path of movement and for clamping said first and second elements against relative movement.

11. Apparatus for transmitting actuating forces to the clutch of a clutch actuated, movable ram machine, comprising, in combination:
    output means in the form of a movable output member for operating a clutch as an incident to its movement;
    input means in the form of an input member for moving said output member;
    interconnecting means responsive to movement of said input means relative to said output member in predetermined degree for interconnecting said input means and said output means for further movement together;
    said interconnecting means comprising a cylinder element and a piston element movable within said cylinder element, each of said elements being connected to a respectively associated one of said output means and said input means;
    said interconnecting means further comprising a spring connected between said piston element and said cylinder element, one of said elements being connected to said input means such that said one element is movable relative to said output means against the bias of said spring as an incident to movement of said input means.

* * * * *